United States Patent [19]

Lin

[11] Patent Number: 4,952,660

[45] Date of Patent: Aug. 28, 1990

[54] COPOLYMER CONTAINING VINYL, UREA AND AMIDE CONSTITUENTS

[75] Inventor: I. Sioun Lin, Hong Kong, Hong Kong

[73] Assignee: ICI Americas Inc., Wilmington, Del.

[21] Appl. No.: 384,945

[22] Filed: Jul. 25, 1989

[51] Int. Cl.$^5$ .............................................. C08G 18/04
[52] U.S. Cl. ...................................... 528/49; 528/69; 528/73; 528/75
[58] Field of Search ......................... 528/49, 69, 73, 75

[56] References Cited

U.S. PATENT DOCUMENTS

| 4,312,972 | 1/1982 | Khanna | 528/63 |
| 4,609,718 | 9/1986 | Bishop et al. | 528/49 |

Primary Examiner—Maurice J. Welsh
Attorney, Agent, or Firm—Richard A. Rowe

[57] ABSTRACT

Tough, moldable copolymers can be made from a reaction system which comprises polymer precursor compounds which form a polymer containing urea and amide linkages and an unsaturated monomer which forms an additional polymer, together with an interpolymer crosslinker which crosslinks the polymer to the addition polymer.

16 Claims, No Drawings

COPOLYMER CONTAINING VINYL, UREA AND AMIDE CONSTITUENTS

This invention relates to a copolymer made from reactants comprising monomeric polymer precursor compounds comprising a polyisocyanate and at least one imino-functional compound reactive therewith, at least one monomeric unsaturated compound capable of entering into an addition polymerization, and an interpolymer crosslinker capable of crosslinking said polymer with an addition polymer.

Conventional polyurea reaction injection molding (RIM) elastomer formulations are well known to the art. See, for example, U.S. Pat. Nos. 4,433,067, 4,396,729, 4,474,901, 4,444,910, and 4,448,904, and European published patent application No. 0081701.

Polyureas are the reaction product, generally, of reactants comprising an amine-terminated softblock resin, a chain extender which is usually an aromatic diamine, and a polyisocyanate. These polymers are regarded as the current state-of-the-art in the evolution of polyurethanes due to their fast reactivity, good high temperature properties, impact strength, and dimensional stability over current polyurethane RIM elastomers.

There are however, problems associated with polyurea technology including processing limitations due to inadequate flow and brittleness of demolded articles, particularly at hardblock contents higher than 50%.

This invention provides a reaction system suitable for use in a reaction injection molding process, said system comprising A. an organic polyisocyanate;
B. an isocyanate-reactive composition which comprises imino-functional softblock component and an amine-functional chain extender;
C. an unsaturated monomer capable of forming an addition polymer; and
D. a crosslinking agent having within its structure a first chemical moiety capable of entering into a polymerization with said component (C) and a second chemical moiety capable of entering into a polymerization with said components (A) and (B).

In said system, components (A) and (B) react to form a polymer containing urea and amide linkages and component (C) reacts to form an addition polymer, said polymer and said addition polymer being cross-linked to each other by said crosslinking agent (D). Crosslinking agent (D) is also referred to herein as an "interpolymer crosslinker".

The present invention also provides copolymers made from the above reaction system and molded objects made from the copolymers.

The reaction system described above has particular utility for making automotive parts such as bumpers and fenders. The presence of a polymerizable unsaturated monomer such as vinyl pyrrolidone in the system has a beneficial effect on system flow and mold filling capabilities, such that geometrically complex molds can be more easily fully penetrated. Also, particularly at high hardblock levels, objects molded from copolymers according to this invention have improved green strength and impact resistance.

The polyisocyanates useful in this invention as component (A) have a number-averaged isocyanate functionality from 1.8 to 4, preferably from 2 to 3, and most preferably 2-2.3. The polyisocyanates have a number-averaged isocyanate equivalent weight from 60 to 1000, preferably from 80 to 500, and most preferably from 125-350, a viscosity from 2 to 5000 centipoises at the processing temperature, preferably from 15 to 900 centipoises, and are at least 50 mol percent, preferably at least 75 mol percent, and most preferably at least 80 mol percent diisocyanates. Aromatic polyisocyanates are preferred.

Suitable aromatic polyisocyanates include, for example, p-phenylene diisocyanate, m-phenylene diisocyanate, 2,4-toluene diisocyanate, 2,6-toluene diisocyanate, naphthalene diisocyanate, dianisidine diisocyanate, polymethylene polyphenyl polyisocyanates, 2,4'-diphenylmethane diisocyanate (2,4' MDI), 4,4'-diphenylmethane diisocyanate (4,4'MDI), 3,3'-dimethyl-4,4'-biphenylene diisocyanate; polydiphenylmethane diisocyanate having a functionality greater than 2, mixtures thereof, and the like. The MDI (2,4' and 4,4') and mixtures and derivatives thereof are most preferred.

Suitable aliphatic polyisocyanates include isophorone diisocyanate, 1,6-hexamethylene diisocyanate, 1,4-cyclohexyl diisocyanate, saturated analogues of the above mentioned aromatic polyisocyanates, mixtures thereof and the like. It is preferred that the polyisocyanate "A" component contain less than 50 percent by weight of aliphatic polyisocyanates based on the total weight of aromatic and aliphatic polyisocyanates in the formulation.

Suitable uretonimine-modified diisocyanates are prepared by a process wherein a polyisocyanate, generally an aromatic polyisocyanate, is heated to a temperature exceeding the melting temperature of the polyisocyanate, for example 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with amine-terminated softblock.

Aromatic polyamines useful as chain extenders in component (B) in this invention have primary and/or secondary isocyanate reactive amine groups attached to aromatic rings, a number-averaged molecular weight which ranges from 93 to about 400 or slightly greater, preferably from 108 to 300, an average primary and/or secondary amine functionality from 1.9 to 3, preferably from 2 to 2.5, and are constituted by at least about 50 mol percent diamines, preferably 70 mol percent diamines, wherein at least 60 percent of the molecular weight and preferably at least 70 percent of the molecular weight consists of atoms contained within or bonded directly to the aromatic rings.

Examples of suitable aromatic polyamines include 3,5-diethyl-2,4-toluenediamine; 3,5-diethyl-2,6-toluenediamine; DETDA which is a mixture of about 80 percent by weight 3,5-diethyl-2,4-toluenediamine and about 20 percent by weight 3,5-diethyl-2,6-toluenediamine; (di-methylthio)toluenediamine; N,N'-dialkyl derivatives of methylene dianiline as known in the art;[4,4'-methylene-bis-(3-chloro-2,6-diethylaniline]; butylated toluene diamine; 1,3,5-tri ethyl-2,6-diamino-benzene; 2,4-diaminotoluene; 2,6-diaminotoluene; 2,4'-diamino-diphenyl-methane; 4,4'-diamino-diphenyl-methane; 3,3'- dimethyl-5,5'-diethyl-4,4'-diamino-diphenylmethane; polyphenylpolymethylene polyamines; and the like.

Aliphatic polyamine compositions can also be used as chain extenders in this invention, although it is preferred that less than 50 percent by weight, based on the total weight of polyamines employed as chain extenders, are aliphatic. Suitable aliphatic polyamines contain acyclic, linear or branched, chains of atoms between reactive (primary and/or secondary) amine groups. These amine groups (by definition) are bonded directly, via the amine nitrogen atom, to aliphatic carbon atoms of the connecting chain(s). The number-averaged molecular weight of the aliphatic polyamine (or mixture of aliphatic polyamines) used as chain extenders is between about 100 and about 500, preferably between 200 and 450; and the number-averaged isocyanate reactive amine functionality is between 1.9 and 2.5, preferably between 2 and 2.3.

In addition to the acyclic aliphatic chains of atoms, the aliphatic polyamine compositions used in this invention may optionally also contain some cyclic structures provided that less than 60 percent, preferably less than 50 percent, of the molecular weight of the polyamine composition is due to atoms which are incorporated into or bonded directly to rings having 7 atoms or less.

Examples of suitable aliphatic polyamines include hydrocarbon polyamines such as hexamethylene diamine and also the amine-terminated polyethers such as those represented below:

$$H_2N-\left(\begin{array}{c}CH_3 \\ | \\ C \\ | \\ H\end{array}-\begin{array}{c}H \\ | \\ C \\ | \\ H\end{array}-O\right)_x\begin{array}{c}H \\ | \\ C \\ | \\ H\end{array}-\begin{array}{c}CH_3 \\ | \\ C \\ | \\ H\end{array}-NH_2 \quad (I)$$

wherein x has an average value between 2 and about 6.

Polyether diamines such as Formula I, above, may be used as mixtures with higher functionality polyether polyamines such as Formula II (below), provided that the mixture meets the requirements of number-averaged amine functionality and equivalent weight described previously:

$$CH_3-CH_2-C+CH_2+O-CH_2-CH(CH_3))_z-NH_2)_3 \quad (II)$$

wherein z has an average value between about 1 and about 2. Other examples of these aliphatic amine compositions include:

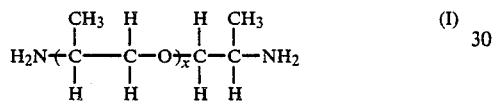

Amine Hydrogen Equivalent Weight=106
Reactive Amine Equivalent Weight=212
Molecular Weight=424

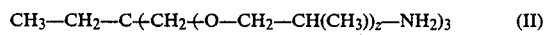

Amine Hydrogen Equivalent Weight=109.5
Reactive Amine Equivalent Weight=219
Molecular Weight=438

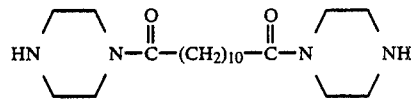

Amine Hydrogen Equivalent Weight=183
Reactive Amine Equivalent Weight=183
Molecular Weight=366
An 83:17 (w/w) blend of a diamine of formula I, having x=6, and piperazine;
Number Averaged Molecular Weight=254
Number Averaged Reactive Amine Equivalent Weight=127
Number Averaged Amine Hydrogen Equivalent Weight=84.6

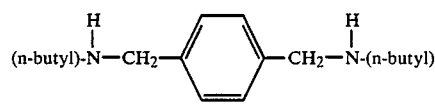

(eq. wt.=110) available under the trademark UNILINK from UOP.

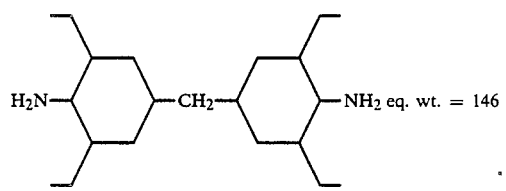

Available under the designation M-MECA from Lonza.

Preferred aliphatic chain extenders are amine-functional polyethers available commercially under the registered trademark JEFFAMINE from Texaco Chemical Corporation as JEFFAMINE D-230 and JEFFAMINE D-400.

The imino functional materials useful as reactants which furnish softblock segments herein are disclosed in U.S. Pat. No. 4,794,129, which is herein incorporated by reference. Such imino-functional compounds will in general be an imino-functional aliphatic polyether resin with a molecular weight of at least 1500, preferably 2000 to 8000, and a number-averaged functionality of imino (C=N) groups at least 1.1, preferably from about 2 to about 4.

Many types of imino-functional compounds are useful in this invention, including (but not limited to) those listed in Table A, following.

The term "softblock" is well known to those in the art. It is the soft segment of a polyurethane or polyurea.

Mainly, it is responsible for the flexibility or elasticity of the material.

TABLE A

| | TYPE |
|---|---|
| $P-R^1-\underset{\underset{R^2}{\|}}{C}=N-R^3$ | Simple imine |
| $P-R^1-O-\underset{\underset{R^2}{\|}}{C}=N-R^3$ | Imino ester |
| $P-Ar-O-\underset{\underset{R^2}{\|}}{C}=N-R^3$ | Imino ester (aromatic) |
| $P-R^1-N=\underset{\underset{R^3}{\|}}{\overset{\overset{R^2}{\|}}{C}}$ | Simple imine |
| $P-R^1-NR^2-\underset{\underset{R^3}{\|}}{C}=N-R^4$ | Amidine |
| $P-R^1-N=C\underset{Ar'}{\overset{R^2}{\diagup}}$ | Simple imine (aromatic) |
| $P-R^1-NR^2-\underset{\underset{R^3}{\|}}{C}=N-Ar'$ | Amidine (aromatic) |
| $P-R^1-\underset{\underset{OR^3}{\|}}{C}=N-R^2$ | Imino ester (aliphatic) |
| $P-R^1-\underset{\underset{OAr'}{\|}}{C}=N-R^2$ | Imino ester (aromatic) |
| $P-R^1-NH-\underset{\underset{NHR^2}{\|}}{C}=NR^2$ | Guanidine |
| $P-R^1-NR^3-C\underset{NR_2^4}{\overset{NR^4}{\diagup\!\!\!\diagup}}$ | Guanidine |
| $P-R^1-NH-\underset{\underset{NHAr'}{\|}}{C}=NAr'$ | Guanidine (aromatic) |
| $P-R^1-O-\underset{\underset{NHR^2}{\|}}{C}=N-R^2$ | Isourea |
| $P-R^1-O-\underset{\underset{NH_2}{\|}}{C}=N-R^3$ | Isourea | wherein:

$R^1$ and Ar are divalent aliphatic and aromatic organic linking groups, respectively;

P represents a polyether or hydrocarbon chain or radical, to which said imino (C=N) functional group is attached as indicated by the drawings;

$R^2$ is H or a monovalent organic aliphatic group of 1 to 10 carbons atoms;

$R^3$ and $R^4$ are monovalent aliphatic organic groups of 1 to 10 carbon atoms, and Ar' is a monovalent aromatic organic group of 6 to 18 carbon atoms.

These stated groups are well known in the art. Thus $R_1$ may in particular be propylene, Ar methoxyphenylene, $R_2$ propyl, $R_3$ propyl, $R_4$ propyl and Ar' methoxyphenyl It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy, N,N-dialkyl-amino etc.

The preparation of these imino functional groups in both cyclic and acyclic forms is well known in the literature.

Isoureas are generally prepared by the reaction of an alcohol with a carbodiimide in the presence of a suitable catalyst The alcohol component may be aliphatic, as described in E. Schmidt, F. Moosmuller, Lieb. Ann. 597. 235, (1956), or aromatic as in E. Vowinkel, Chem. Ber., 96. 1702, (1963). The catalysts employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E. A. Werner, J. Bell, J. Chem. Soc., 121, 1790, (1922) In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F. C. Schaefer, G. A. Peters, J. Org. Chem., 26. 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thi-azines. Methods for the preparation of oxazolines and oxazines are also described in U.S. Pat. No. 3630996 to D. Tomalia, U.S. Pat. No. 3640957 to D.

Tomalis and R. J. Thomas, in H. Witte, W. Seeliger, Angew. Chem. Int. Ed., 1972, 287 and in U.S. Pat. No. 3813378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds:

Imidazole and its Derivatives", Part I, Ed. A. Weissberger, author K. Hofman, Interscience Publishers, New York, 1953 and references therein Particularly useful for the preparation of imidazoline terminated softblocks from cyanoethylated polyether polyols would be the method outlined in U.S. Pat. No. 4006247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds The Pyrimidines, Supplement I", Ed. A. Weissberger and E. C. Taylor, author D. J. Brown, Interscience Publishers, New York, 1953.

The preparation of an imine can be achieved by any of a number of well documented procedures In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

Unsaturated monomers which may be used in component (C) in this invention include but are not limited to
N-Vinyl Pyrrolidone
Acrylic Acid
Methyl Methacrylate (MMA)
Acrylonitrile
Styrene
Vinyl Chloride
Vinyl Acetate
Methyl Acrylate
Isobornyl Methacrylate
N, N-Dimethylacrylamide
Lauryl Methacrylate
N-(isobutoxymethyl) acrylamide.
N-vinyl pyrrolidone is preferred.

Along with the vinyl monomer, an initiator will preferably also be included as part of the reaction system. Initiators known to the art such as azo and peroxide compounds can be used and include:
2,2-azobis-(2,4-dimethylvalerontrile)
2,2-azobis-(2,4,-dimethyl-4-methoxyvaleronitrile)
Azobis-2-methyl-butyronitrile
Azobisisobutyronitrile
Cumene Hydroperoxide
t-Butyl Perbenzoate
t-Amyl Peroxy Pivalate
t-Butyl Peroxy Pivalate t-Butyl Peracetate
t-Butyl Peroctoate
t-Butyl Peroxyisobutyrate
di-t-Butyl Peroxide
t-Butyl Hydroperoxide
di-Cumyl Peroxide
2,2-di(t-Butyl Peroxy) Butane
1,1-di(t-Butyl Peroxy) Cyclohexane
2,5-di-Methyl-2,5-bis(2-Ethyl Hexoyl Peroxy) hexane If desired, a promoter for the vinyl initiator can also be employed and includes compounds known for such purpose such as dimethylaniline or cobalt naphthenate.

The interpolymer crosslinker useful as component (D) has one terminus or group capable of entering into an addition polymerization and another terminus or group which is an isocyanate group or reactive toward isocyanate groups. The types of molecules suitable can be generally designated as

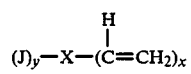

wherein
X is a connecting group which is inert to the reaction, recognizing, of course that different connecting groups can produce different physical properties in the copolymer. X can be, but is not limited to, hydrocarbon, the residue of an unsaturated acid (i.e., that portion exclusive of a group containing a reactive double bond and reactive acid —OH group) such as acrylic, methacrylic, and so forth, polyether, (e.g. polyoxyethylene, polyoxypropylene), or the like.

J is an isocyanate group (—NCO), an isocyanate-reactive group such as —OH, —NH$_2$, —SH, or —COOH, or a group which reacts with active hydrogens such as

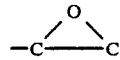

In any case J reacts with a reactive group on at least one polyurea precursor component to effect cross-linking, and x and y are most usually 1, but can independently, be as high as 3, or some (average) number between 1 and 3 if a mixture of compounds is used.

Examples of interpolymer crosslinkers which can be used in this invention incude
Hydroxylpropyl Methacrylate (HPMA)
Hydroxyethyl Methacrylate
Hydroxyethyl Acrylate
t-Butylamino Ethyl Methacrylate (TBM)
Acrylamide
Vinyl Alcohol
Polyethylene Glycol Methacrylate (PEGM)
Polypropylene Glycol Monomethacrylate (PPGMM) having a molecular weight of up to 2000, preferably less than 1000
Allyl Glycidyl Ether
N-methylolacrylamide
Isocyanatoethyl methacrylate
Unsaturated aliphatic isocyantes such as m-TMI: (Benzene, 1-(1-isocyanato-1-methyl ethyl)-4-(1-methyl ethyl))
β-Carboxyl ethyl acrylate The reaction systems of the present invention may further include additives such as internal mold release agents, catalysts, surfactants, fillers and the like. Suitable internal mold release agents include, for example, carboxylate salts of metals such as zinc and copper, and polysiloxanes known and used for such purpose. The amount of internal mold release agent used can be from 0.001 to 3.0 percent by weight of the total reactants.

Catalysts are generally not required during the preparation of polyureas by RIM. Catalysts may, however, be used if desired.

Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkyl-amines which include, for example, trimethylamine, triethylamine; heterocyclic amines such as N-alkyl-morpholines which include, for example, N-methyl-morpholine, N-ethylmorpholine; 2,2'-bis(dimethyl-amino)-diethyl ether; 1,4-dimethylpiperazine, triethylenediamine, and aliphatic polyamines such as N,N, N',N'-tetramethyl-1,3-butanediamine or N-methyl diethanolamine. The amount of catalyst used is less than about 5 percent by weight of the total reactants, preferably less than 1%. Combinations of tertiary amine and organotin catalysts are frequently used in the art. Isocyanurate catalysts, such as alkali metal salts of carboxylic acids, may also be added to the formulations of the invention.

Another group of catalysts, which are more specific for the isocyanate-amine reaction, include carboxylic acids, and precursors thereof (such as acid anhydrides) Specific examples of carboxylic acid catalysts include oleic acid, 1,12-dodecanedioic acid, isophthalic acid, etc. These types of catalysts are described in U.S. Pat. Nos. 4,499,254; 4,487,908; and 4,487,912.

Catalysts may be useful as processing aids in some formulations.

Suitable surfactants include, for example, sodium salts of castor oil sulfonates; alkali metal or ammonium salts of sulfonic acid such as dodecyl benzene sulfonic acid; and polyether siloxanes having a structure such that a copolymer of ethylene oxide and propylene oxide is attached to a polydimethyl siloxane radical. The amount of surfactant used is less than about 3 percent by weight of the total reactants.

Suitable fillers include fibers such as fiberglass. Shorter fibers are always preferred for ease of processing if they are to be incorporated directly into the "A" or "B" component liquid stream. Other particularly suitable fillers are flakes or platelets of mineral fillers such as mica, fumed silica, flake glass, Wollastonite and the like. Coupling agents, such as amino or epoxy silane types, may be used to improve adhesion between the reinforcing filler and the polymer. Other optional additives include fire retardants, smoke suppressants, plasticizers, dyes, and pigments, each individually used in amounts of about 5% by weight of the total system, or less. The additives may be incorporated into either component of the reactive system, or both components, provided that the additives are compatible with the component(s) chosen. Alternatively, any or all of the additives may, if possible, be incorporated into the polymers as a third stream.

The polymers of the present invention comprise the reaction products of two liquid streams, an "A" Component, a polyisocyanate, and a "B" Component, comprising the mixture of chain extenders and softblock compromising the imino-functional composition and other supplemental reactants having active hydrogen. The vinyl monomer may be incorporated into either the "A" or "B" component. The initator may also be incorporated in the same or a different component. The initiator is used in an amount of 0.01–3%, preferably 0.3–0.5%, based on the weight of all reactive components which comprise the unreacted formulation (i e , the reaction system) A promoter, if employed at all, will generally be used in an amount of 0.01 to 0.5 based on the weight of all reactive components.

The interpolymer crosslinker is preferably incorporated into the "B" component although it may be prereacted with and thereby incorporated into the "A" component.

The mixture of compounds in the "B" Component blend is constituted by from 25 to 60 percent by weight of said mixture of the chain extender and from about 75 to about 40 percent by weight of the imino-functional soft-block component.

The unreacted formulation will contain, based on the weight of all reactive ingredients (comprising the polyisocyanate, softblock, and chain extender), from 1–30%, preferably 5–15%, of vinyl monomer and from 1–30 wt. %, preferably 2–20 wt. %, of the interpolymer crosslinker.

The copolymers of the present invention can be shaped into useful articles such as automobile parts, by reaction injection molding (RIM) process, which is performed in a RIM machine.

Examples of RIM machines include those manufactured by Admiral Equipment Corp., Akron, Ohio; by Cincinnati Milacron Corp., Cincinnati, Ohio; Battenfeld Corporation, Mienerzhajen, West Germany; and by Krauss Maffei GmbH, West Germany.

Another useful machine known to those skilled in the art, called the Mini RIM machine, is manufactured by the University of Minnesota, Minneaspolis, Minn. It is an ideal machine suitable for small volume (chemical) evaluation. Modifications have been made in the machine used in the examples herein to improve the mixing pressure and efficiency. The modifications include replacing the drive cyclinder (by gas) with a hydraulic piston and modifying the orifice on the mixhead. In addition, the maximum output (i.e. shot size) is quite different compared to a large scale RIM machine, 1 kilogram per second for a typical large scale machine versus 0.23 kilogram per second for the Mini RIM.

In a "B" Component which is a mixture of active hydrogen-containing material and, if desired, the interpolymer crosslinker, vinyl monomer and initiator, the active hydrogen-containing reactants may be blended in a suitable container and agitated at a temperature from about 20° C. to about 100° C. for a time between five and sixty minutes using a high sheer blade such as a Cowles blade, at a rotational speed of 50 to 2500 rpm.

The "A" and "B" Components are placed in separate containers, which are generally equipped with agitators, of the RIM machine wherein the temperature of the "A" Component is 20° to 100° C. and the temperature of the "B" Component is from 20° C. to 125° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 50 to about 350 bar. It is generally necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

In practice the reaction to form the polyurea portion of the copolymer is exothermic and supplies sufficient heat to cause decomposition of the initiator to form chain initiating radicals for the addition polymerization. Thus the addition polymerization and crosslinking to the polyurea take place once initiator radicals have formed, which is substantially simultaneously with the polyurea formation.

The amount of the "A" and the "B" Components pumped to the mix head is measured as the ratio by weight of the "A" Component to the "B" Component wherein the ratio is from 1:6 to 6:1 preferably betWeen 0.8:1 and about 1.25:1 depending upon the formulation used and the isocyanate index desired.

The impingement mixed blend of "A"/"B" components is injected into a mold at a velocity from 0.14 kg/sec to about 4.54 kg/sec. The mold is heated to a temperature from about 20° C. to 200° C. Suitable molds are generally made of metal such as aluminum or steel. Usually an external mold release agent is applied.

A molded copolymer article is formed after the impingement mixture is in a closed mold from about 1 second to about 120 seconds. The mold can then be opened and the polyurea molded product can be removed from the mold. The molded product may be post cured by placing the product in an oven having a temperature between 100° C. and about 200° C. for a time from about ½ hour to about 3 hours. Polyureas of the invention are easily processable and can usually be demolded without damage.

Although not essential to the successful practice of this invention, it is within the scope of the invention to incorporate reactive ingredients into the formulations of the invention, in minor amounts, which are different from the types of reactants specifically described herein.

The polymer constituents comprising the formulations of this invention are processed at an isocyanate index between 0.70 and 1.50, preferably between 0.95 and 1.10; with the proviso that, if a catalyst for the conversion of isocyanate to isocyanurate groups is present, the index may extend up to about 5.00.

The examples which follow are intended to further disclose and describe the invention, but are in no way intended to be limiting. A glossary of terms used in the examples follows.

GLOSSARY

XI-208 A modified diphenylmethane diisocyanate having an average isocyanate equivalent weight of about 135; Available as RUBINATE XI 208 from ICI Americas Inc.

DETDA A mixture consisting of about 80% by weight 3,5-diethyl-2,4-diaminotoluene and 20% 3,5-diethyl-2,6-diaminotoluene, commercially available from Ethyl Corporation.

D-2000 A 2000 molecular weight polyoxypropylene diamine, which is commerically available from Texaco Chemical Corporation under the registered trademark JEFFAMINE.

HPMA Hydroxypropylmethacrylate, obtained commercially from Rohm & Haas.

NVP N-vinyl pyrrolidone, available commercially from GAF Corporation.

VAZO-52 2,2'-Azobis (2,4-dimethylvaleronitrile), available commercially from Dupont.

D-2000 Acetone The acetone imine of D-2000

XCE-89 Butylated toluenediamine, commercially available from Air Products.

T-5000 A polyoxypropylene triamine, commercially available from Texaco Chemical Corporation as JEFFAMINE T-5000. The molecular weight is 5000.

T-5000 C.H. The cyclohexanone imine of T-5000.

A series of copolymer formulations was processed on a mini-RIM Machine, as previously described. The compositions of each side ("A" and "B") used to make the copolymers are shown for each example in each of Tables 1-2 which follow. Amounts of components are in parts by weight (pbw) unless otherwise noted. Physical conditions for molding are also noted in the Tables.

Physical properties were determined on test plaques 30 cm square having a thickness of about 3 millimeters. Flexural Modulus was determined according to ASTM D790. Tensile strength was determined according to ASTM D412. Tear resistance was determined according to ASTM D624. Heat sag was determined according to ASTM D256. Shore D hardness was determined according to D2240. Specific gravity was determined by water displacement.

Example 1 of Table 1 is a polymer/N-poly-vinyl pyrrolidone control blend not according to the invention in that no iminofunctional softblock reactant was included in the formulations. Example 2 is according to the invention and was processed using the imino-functional softblock noted.

Examples 3 and 5 of Table 2 are polymer/N-vinyl pyrrolidone blends not according to the invention in that in these Examples no imino-functional softblock component was employed. Example 4 is according to the invention.

TABLE 1

| Example | 1 | 2 |
|---|---|---|
| A-Component | | |
| XI-208 | 30 | 30 |
| B-Component | | |
| XCE-89 | 13.18 | 13.18 |
| D-2000 | 47.72 | — |
| D-2000 Actone | — | 47.72 |
| HPMA | 1.59 | 1.59 |
| NVP | 8 | 8 |
| Vazo-52 | 0.5 | 0.5 |
| B/A Ratio | 2.3496 | 2.3496 |
| Isocyanate index | 1.07 | 1.07 |
| Hardblock, % | 46.93 | 46.93 |
| A-Comp., °C. | 30 | 30 |
| B-Comp., °C. | RT | RT |
| Mold Temp., °C. | 100 | 100 |
| Demold Time, sec. | 60 | 60 |
| Specific gravity | 1.11 | 1.12 |
| Hardness, Shore D | 58-61 | 64-66 |
| Flex. Modulus, (MPa) | | |
| 22° C. | 338 | 462 |
| −30° C. | 807 | 924 |
| 70° C. | 214 | 269 |
| Modulus Ratio, (−30° C., 70° C.) | 3.77 | 3.43 |
| Tensile Strength, (MPa) | 25.6 | 24.6 |
| Elongation, (%) | 200 | 157 |
| Tear Resistance, (kg/m) | 11,020 | — |
| Heat Sag, 150 mm O/H, 1 hr (mm) 135° C. | 25 | 2.5 |
| Notched Izod, (J/m) | 336 | 575 (Partial Break) |
| Plaque on Demold | Excellent Green Strength | Excellent Green Strength |

TABLE 2

| Example | 3 | 4 | 5 |
|---|---|---|---|
| A-Component | | | |
| XI-208 | 27.41 | 27.41 | 27.41 |
| NVP | 8 | 8 | 8 |
| Vazo-52 | 0.5 | 0.5 | 0.5 |
| B-Component | | | |
| DETDA | — | — | 14 |
| XCE-89 | 14 | 14 | — |
| T-5000 | 49.15 | — | 49.15 |
| T-5000 C.H. | — | 49.15 | — |
| HPMA | 1.45 | 1.45 | 1.45 |
| B/A Ratio | 1.7986 | 1.7986 | 1.7986 |
| Isocyanate index | 1.05 | 1.05 | 1.05 |
| Hardblock, % | 45 | 45 | 45 |
| A-Comp., °C. | RT | RT | RT |
| B-Comp., °C. | 40–50 | 40–50 | 40–50 |
| Mold Temp., °C. | 100 | 100 | 100 |
| Demold Time, sec | 60 | 60 | 60 |
| Specific gravity | 1.11 | 1.12 | 1.105 |
| Hardness, Shore D | 62–65 | 63–66 | 58–60 |
| Flex. Modulus, (MPa) | | | |
| 22° C. | 462 | 552 | 331 |
| −30° C. | 1028 | 1228 | 497 |
| 70° C. | 269 | 352 | 255 |
| Modulus Ratio, (−30°, 70° C.) | 3.82 | 3.49 | 1.94 |
| Tensile Strength, (MPa) | 24.7 | 28.2 | 22.1 |
| Elongation, (%) | 100 | 95 | 113 |
| Tear Resistance, (kg/m) | 8394 | 2822 | — |
| Heat Sag, 150 mm O/H, 1 hr (mm) 135° C. | 20.1 | 10.4 | 7.6 |
| Notched Izod, (J/m) | 310 | 208 | 307 |
| Plaque on Demold | Excellent Green Strength | Excellent Green Strength | Excellent Green Strength |
| HDT(°C.) @ 264 psi | 44 | 46 | 48 |

EXAMPLE 6

This example illustrates the preparation of the D-2000 imine of acetone.

A mixture of D-2000 (515 g), acetone (256 g), and toluene (256 g) was heated and refluxed (approx. 70° C.) for one hour with stirring under an $N_2$ atmosphere. Excess acetone, toluene and water were then distilled off. The product was then further refined by pulling a vacuum (less than 1 torr) and heating to a maximum temperature of 130° C. during vacuum to remove residual toluene, water, and acetone.

Other amines can be prepared by procedures generally as illustrated in Example 6 and as disclosed and exemplified in U.S. Pat. No. 4,794,129 herein incorporated by reference.

We claim:

1. A reaction system, comprising
   A. an organic polyisocyanate;
   B. an isocyanate-reactive composition which comprises an imino-functional softblock component and a chain extender;
   C. an unsaturated monomer capable of forming an addition polymer; and
   D. a crosslinking agent having within its structure a first chemical moiety capable of entering into a polymerization with said component (C) and a second chemical moiety capable of entering into a polymerization with said components (A) and (B).

2. A reaction system as defined in claim 1, wherein said polyisocyanate is aromatic, has a number averaged functionality of from 1.8 to 4, and a number averaged equivalent weight from 60 to 1000.

3. A reaction system as defined in claim 2, wherein said polyisocyanate comprises diphenylmethane diisocyanate (MDI).

4. A reaction system as defined in claim 1, wherein said unsaturated monomer is selected from the group consisting of N-vinyl pyrrolidone, acrylic acid, methyl methacrylate (MMA), acrylonitrile, styrene, vinyl chloride, vinyl acetate, methyl acrylate, isobornyl methacrylate, N,N-dimethylacrylamide, lauryl methacrylate, and N-(isobutoxymethyl) acrylamide.

5. A reaction system as defined in claim 4, wherein said unsaturated monomer is N-vinyl pyrollidone.

6. A reaction system as defined in claim 1, wherein said crosslinking agent is selected from hydroxylpropyl methacrylate (HPMA), hydroxyethyl methacrylate, hydroxyethyl acrylate, t-butylamino ethyl methacrylate (TBM), acrylamide, vinyl alcohol, polyethylene glycol methacrylate (PEGM), polypropylene glycol monomethacrylate (PPGMM) having a molecular weight of up to 2000, allyl glycidyl ether, N-methylolacrylamide, isocyanato-ethyl methacrylate, unsaturated aliphatic isocyanates and β-carboxyl ethyl acrylate.

7. A reaction system as defined in claim 1, wherein said imino-functional softblock component is selected from

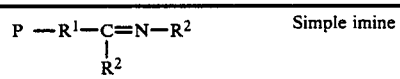 Simple imine

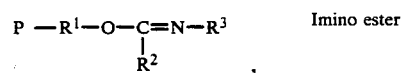 Imino ester

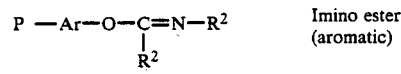 Imino ester (aromatic)

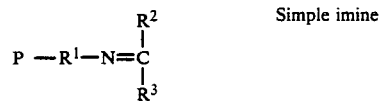 Simple imine

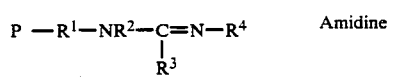 Amidine

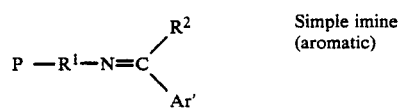 Simple imine (aromatic)

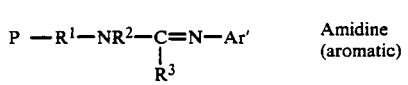 Amidine (aromatic)

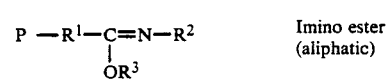 Imino ester (aliphatic)

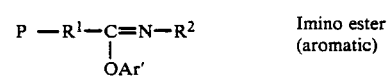 Imino ester (aromatic)

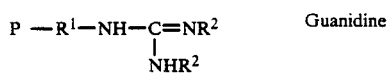 Guanidine

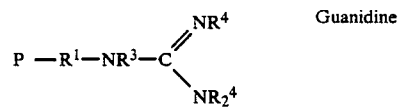 Guanidine

-continued

| Structure | Type |
|---|---|
| P —R$^1$—NH—C(=NAr')—NHAr' | Guanidine (aromatic) |
| P —R$^1$—O—C(=N—R$^2$)—NHR$^2$ | Isourea |
| P —R$^1$—O—C(=N—R$^3$)—NH$_2$ | Isourea | wherein:
R$^1$ and Ar are divalent aliphatic and aromatic organic linking groups, respectively;
P represents a polyether or hydrocarbon chain or radical to which said imino (C=N) functional group is attached as indicated by the drawings;
R$^2$ is H or a monovalent organic aliphatic group of 1 to 10 carbon atoms;
R$^3$ and R$^4$ are monovalent aliphatic organic groups of 1 to 10 carbon atoms, and
Ar' is a monovalent aromatic organic group of 6 to 18 carbon atoms.

8. A method of making a polymer, comprising reacting reactants comprising
A. an organic polyisocyanate;
B. an isocyanate-reactive composition which comprises an imino-functional softblock compound and a chain extender;
C. an unsaturated monomer capable of forming an addition polymer; and
D. a crosslinking agent having within its structure a first chemical moiety capable of entering into a polymerization with said component (C) and a second chemical moiety capable of entering into a polymerization with said components (A) and (B), wherein components (A) and (B) react to form a polymer and component (C) reacts to form an addition polymer, said polymer and said addition polymer being crosslinked to each other by said crosslinking agent (D).

9. A method as defined in claim 8, wherein said polyisocyanate is aromatic, has a number averaged functionality of from 1.8 to 4, and a number averaged equivalent weight from 60 to 1000.

10. A method as defined in claim 9, wherein said polyisocyanate comprises diphenylmethane diisocyanate (MDI).

11. A method as defined in claim 8, wherein said unsaturated monomer is selected from the group consisting of N-vinyl pyrrolidone, acrylic acid, methyl methacrylate (MMA), acrylonitrile, styrene, vinyl chloride, vinyl acetate, methyl acrylate, isobornyl methacrylate, N, N-dimethylacrylamide, lauryl methacrylate, and N-(isobutoxymethyl) acrylamide.

12. A method as defined in claim 11, wherein said unsaturated monomer is N-vinyl pyrrolidone.

13. A method as defined in claim 8, wherein said crosslinking agent is selected from hydroxylpropyl methacrylate (HPMA), hydroxyethyl methacrylate, hydroxyethyl acrylate, t-butylamino ethyl methacrylate (TBM), acrylamide, vinyl alcohol, polyethylene glycol methacrylate (PEGM), polypropylene glycol monomethacrylate (PPGMM), having a molecular weight of up to 2000, allyl glycidyl ether, N-methylolacrylamide isocyanato-ethyl methacrylate, unsaturated aliphatic isocyanates and β-carboxyl ethyl acrylate.

14. A method as deinfed in claim 8, wherein said imino-functional softblock compounds is selected from

| Structure | Type |
|---|---|
| P —R$^1$—C(=N—R$^3$)—R$^2$ | Simple imine |
| P —R$^1$—O—C(=N—R$^3$)—R$^2$ | Imino ester |
| P —Ar—O—C(=N—R$^3$)—R$^2$ | Imino ester (aromatic) |
| P —R$^1$—N=C(R$^2$)(R$^3$) | Simple imine |
| P —R$^1$—NR$^2$—C(=N—R$^4$)—R$^3$ | Amidine |
| P —R$^1$—N=C(R$^2$)(Ar') | Simple imine (aromatic) |
| P —R$^1$—NR$^2$—C(=N—Ar')—R$^3$ | Amidine (aromatic) |
| P —R$^1$—C(=N—R$^2$)—OR$^3$ | Imino ester (aliphatic) |
| P —R$^1$—C(=N—R$^2$)—OAr' | Imino ester (aromatic) |
| P —R$^1$—NH—C(=NR$^2$)—NHR$^2$ | Guanidine |
| P —R$^1$—NR$^3$—C(=NR$^4$)(NR$_2^4$) | Guanidine |
| P —R$^1$—NH—C(=NAr')—NHAr' | Guanidine (aromatic) |
| P —R$^1$—O—C(=N—R$^2$)—NHR$^2$ | Isourea |
| P —R$^1$—O—C(=N—R$^3$)—NH$_2$ | Isourea | wherein:
R$^1$ and Ar are divalent aliphatic and aromatic organic linking groups, respectively;
P represents a polyether or hydrocarbon chain or radical, to which said imino (C=N) functional group is attached as indicated by the drawings;
R$^2$ is H or a monovalent organic aliphatic group of 1 to 10 carbons atoms;
R$^3$ and R$^4$ are monovalent aliphatic organic groups of 1 to 10 carbon atoms, and
Ar' is a monovalent aromatic organic group of 6 to 18 carbon atoms.

15. A polymer made by a method as defined in claim 8.

16. A molded article made from a polymer as defined in claim 15.

* * * * *